United States Patent Office 3,009,831
Patented Nov. 21, 1961

3,009,831
IMPREGNATED FILMS OF REGENERATED CELLULOSE
Hubert Wilfinger, Ludwigshafen (Rhine), Germany, assignor to Badische Anilin- & Soda-Fabrik Aktiengesellschaft, Ludwigshafen (Rhine), Rheinland-Pfalz, Germany
No Drawing. Filed Feb. 9, 1959, Ser. No. 791,863
Claims priority, application Germany Feb. 10, 1958
6 Claims. (Cl. 117—144)

This invention relates to films of regenerated cellulose which are impregnated with materials which prevent adherence of the films during storage and which are a good base for hydrophobic coatings. The invention relates more particularly to films of regenerated cellulose which are impregnated with reaction products derived from the reaction of a greater amount of a 1,2-alkylene imine with a smaller amount of an alkylating or acylating agent. The invention relates also to said impregnated films of regenerated cellulose which have been coated with hydrophobic or moistureproof coatings.

It is known that the adhesiveness of hydrophobic coatings of, for instance, nitrocellulose, polyethylene or vinylidene chloride on films of regenerated cellulose can be increased by treating them with polymerized alkylene imines at any stage of the manufacturing process. The adhesiveness of the coating material can thereby be increased to such a degree that the stability in boiling water of the coating on the film is improved significantly.

In the prior method, the polymerized alkylene imines are used in a bath, together with materials which act as plasticizers, such as glycerol or polyglycol or, for instance, with urea, or they are applied in a separate operation on to the finished films, in the form of solutions.

However, the films of regenerated cellulose which are treated with polymerized alkylene imines according to the prior method, have a tendency to stick together if, before coating, they have been in storage for some time, as is frequently the case. This disadvantage is particularly conspicuous at pressure points where the different sheets of the film adhere tightly, causing tears during unrolling.

It is also known that films of regenerated cellulose can be impregnated with materials which improve the sliding or slipping properties of the films. These materials include condensation products of polyalkylene polyamines with higher fatty acids, such as palmitic, stearic, oleic or linoleic acid.

One object of the invention is to provide foils or films of regenerated cellulose which can be stored in rolls or the like without sticking together before the application of hydrophobic coatings. Another object of the invention is to provide films of regenerated cellulose to which hydrophobic coatings will adhere.

The following is a diagrammatic illustration of the article of this invention:

| Moistureproof coating: e.g. nitrocellulose or vinyl polymer |
| Regenerated cellulose impregnated with the reaction product of an alkylene imine with an alkylating agent or an acylating agent |

These objects are achieved by impregnating the films of regenerated cellulose with the watersoluble reaction products obtained by reacting several mols of a 1,2-alkylene imine or a 1,2-polyalkylene imine with an alkylating agent or an acylating agent. In the following description these reaction products will be referred to as "bonding materials."

The term "alkylating agents" stands for aliphatic compounds which contain in the molecule a reactive atom or group, for example, a halogen atom or a sulfuric ester group, by means of which the alkylating agent can be reacted with a primary or secondary amine so that a hydrogen on the nitrogen atom of the amine is substituted by the aliphatic radical, preferably an alkyl radical. The alkylating agents may contain from 4 to 22 carbon atoms in the aliphatic or alkyl radical. Preferred are those with from 8 to 18 carbon atoms, such as 2-ethylhexyl chloride, decylchloride, dodecylchloride, octadecylchloride, or the corresponding bromides, or mixtures of these compounds. "Halogen paraffins" is a common term for these compounds.

The halides can also be described as hydrohalogen acid esters of alcohols. However, for the realization of the films produced in accordance with this invention, it is not of decisive importance by which reactive groups the alkyl groups contained in the bonding materials have been introduced, and therefore sulfuric acid esters of aliphatic alcohols containing the above specified number of carbon atoms can likewise be used as alkylating agents. The alkyl radicals can be branched or straight chained.

The term "acylating agent" designates compounds in which a carbonyl group is combined, on the one hand, with an aliphatic radical, preferably an alkyl radical, thus forming an acyl radical, and on the other hand with a reactive atom or group, for example, a halogen atom or an acyloxy radical, by means of which reactive atom or group the acylating agent can be reacted with a primary or secondary amine so that a hydrogen on the nitrogen atom of the amine is substituted by the acyl radical. Carboxylic acid halides are preferred as acylating agents. It is not of importance for the value of the bonding agents by which reactive group the acyl radicals have been introduced. The acylating agents may contain from 4 to 22 carbon atoms in the acyl radical. Preferred are those with from 8 to 18 carbon atoms in the acyl radical. Suitable acid halides are, for instance, acid chlorides such as lauroyl chloride, myristoyl chloride, palmitoyl chloride, stearoyl chloride or the corresponding bromides or mixtures of these compounds.

The bonding materials can be obtained by reacting from 5 to 100 mols, preferably from about 8 to 40 mols, of a 1,2-alkylene imine, such as ethylene imine or a C-lower alkyl substituted alkylene imine, with approximately one mol of an alkylating agent or acylating agent such as an alkyl halide, for instance chloroparaffin of a chain length of $C_8$ to $C_{20}$, or a corresponding acid halide or, for instance, an alkyl sulfuric acid ester, by first preparing a polymerized alkylene imine and then reacting this with the alkylating agent or the acylating agent. Such a process is described in German Patent 662,451. Monomeric 1,2-alkylene imine and the alkylating agent or acylating agent may also be brought together in the desired molecular ratio and allowed to react at elevated temperatures with exclusion of water. It is evident that such products are able to condense further on the regenerated cellulose film on account of the reactive groups still contained in them as 1,2-alkylene imine rings.

The bonding materials are generally applied as free bases in aqueous solution. However, they can also be applied as salts. Suitable for the salt formation are inorganic and organic acids which are not too weak, for instance hydrochloric acid, hydrobromic acid, sulfuric acid or lower fatty acids, such as formic acid or acetic acid.

The molecular proportion of 1,2-alkylene imine to the alkylating agent or acylating agent, which is preferentially selected as being between 8 and 40:1, can be varied within or beyond this range, depending to some extent on the particular method of production of the regenerated cellulose films. For instance, if the drying temperature of the regenerated cellulose film is below 90° C., it is desirable to include in the condensate a higher proportion of alkylating agent or acylating agent than when the drying temperature is higher, because the tendency of regenerated cellulose film which has been treated according to this invention to stick together decreases as the drying temperature increases.

For the purposes of this invention films of regenerated cellulose are those which have been produced by the viscose or cuprammonium processes.

The cellulose films can be impregnated with the bonding material in the course of the usual steps of the manufacturing process. For instance, the bonding materials may be added to the wash baths which are used in the manufacture of regenerated cellulose films subsequent to the precipitation and bleaching baths. In this case, concentrations of about 5 to 20 g. of the bonding material per liter of wash fluid are employed.

If the process comprises separate preparation baths in which the contact time is shorter, higher concentrations, e.g. 50 to 100 g. per liter of water, should be used. Plasticizers are generally added to the last bath, and if they are compatible with the bonding agent, as are, for instance, glycols, glycerol or urea, these compounds may be added together to the wash baths.

The finished regenerated cellulose film may also be sprayed or in some other manner treated with an aqueous solution of about 0.5 to 5% of the bonding material. For instance, the regenerated cellulose film may be treated with the bonding material on a coating machine.

In using the terms "impregnating" or "treating," I include all the methods of applying the bonding material in dissolved condition to the cellulose film. The methods specified above are given for illustration only and the invention is not restricted thereto.

The regenerated cellulose films treated in accordance with this invention with the described bonding agents may, after drying, be coated in known manner with a hydrophobic or moistureproof coating. As hydrophobic or moistureproof coatings there may be used, for instance, nitrocellulose, polyethylene or polymers or copolymers of vinyl chloride or vinylidene chloride. Particularly waterproof coatings are obtained with copolymers which contain a large proportion of vinylidene chloride, preferably more than 80%. The polymers which are preferred for the moistureproof coatings are those which are soluble in organic solvents.

The coating step is carried out in known manner with solutions of the hydrophobic high-molecular weight coating materials in organic solvents. However, it may also be carried out with aqueous dispersions. The coating may be applied to one side or to both sides of the cellulose film.

It is a particular advantage of this invention that, when treated with the bonding materials, the regenerated cellulose films may be stored for an extended period in roll form. It is therefore possible to store the regenerated cellulose film treated in accordance with this invention for some time before coating with the hydrophobic material. The shelf life of the films, of course, is dependent on the temperature and the humidity of the rooms in which they are stored.

The quantity of bonding material to be applied for optimum effect, depends generally on the character of the film of regenerated cellulose and the hydrophobic coating to be applied later and can easily be determined by practical means. Preferred are applications of from 0.01 to about 0.5 g. of bonding material per 100 g. of cellulose film.

From experience with known materials it was not to be inferred that the effect of the bonding materials described here would be fully satisfactory and would prevent the troublesome sticking together of the films. It is particularly surprising that one impregnation material should possess two particularly desirable properties, i.e. prevention of the sticking together of the different layers of film and promotion of good adhesion between the regenerated cellulose film and hydrophobic coating. On the one hand, there was reason to believe that polyalkylene imines, when their tackiness was removed, would not have the capacity to act as bonding agents. Conversely, it was to be feared that a material which decreases self-adherence between contacting layers of regenerated cellulose film would lose this property as soon as it was invested with bonding properties.

The following examples are given as illustrations of the invention.

*Example 1*

After producing a cellulose film from viscose in the usual manner, the regenerated cellulose film is treated in the plasticizer bath, which has been positioned as the last wet bath before the drying operation, with a solution of the following composition:

20 g. per liter of glycerol
30 g. per liter of triglycol
30 g. per liter of urea
1 g. per liter of a reaction product of polyethylene imine and octadecylchloride or bromide in the mol ratio of 20:1

Subsequent to this treatment the film is dried, rolled and coated with a hydrophobic lacquer. This lacquer is composed as follows:

Solvent: Equal parts of ethyl acetate and toluene, total 500 parts by weight
Nitrocellulose: 50 parts by weight
Non-sticking alkyd resin: 8 parts by weight
Dicyclohexyl phthalate: 25 parts by weight
Dibutyl phthalate: 12 parts by weight
Paraffin—melting point 60° C.: 5 parts by weight The lacquering can be done immediately after the production of the film, or if desired, several days later. In contrast to films treated with pure polyethylene imine, the unrolling of the film is not hampered by troublesome self-adherence which, in the case of high humidity, may result in complete solidification of the roll.

The bonding lacquer is tested by immersing the film in boiling water for 10 minutes and then dyeing with a 1% solution of methylene blue. This dyes the film only at those spots where the lacquer has separated from the film. If it has been prepared according to the method described above, the film is dyed only at the breaks, whereas a film treated with the plasticizer alone is shown to have lost the entire lacquer coating during the boiling.

The bonding material used in this example was produced as follows:

860 parts of dehydrated ethylene imine (20 mols) and 289 parts of octadecylchloride or 333 parts of octadecylbromide (1 mol) are run simultaneously into a stirring vessel provided with a counter-flow cooler in such a manner that the selected molecular proportion remains constant during the whole operation and that the quantity of condensate flowing from the cooler remains likewise constant. The exothermic reaction generally furnishes just enough heat to avoid the necessity of either heating or cooling. After about 2 hours the charge is finished. The reaction material becomes progressively more viscous and is stirred an additional hour until no further reflux is observed. The resulting product is an entirely water-soluble product suitable for the treatment of regenerated cellulose films in the manner described above.

Similar products for the same purpose are obtained if the compounds listed in the following table are reacted as described above.

| Alkylene imine (a) | Parts by weight | Alkylating or acylating compound (b) | Parts by weight | Molecular proportion (a:b) |
|---|---|---|---|---|
| Ethylene imine | 4,300 | Octadecylchloride | 275 | 100:1 |
| Do | 215 | ___do___ | 275 | 5:1 |
| C-methyl ethylene imine | 570 | ___do___ | 275 | 10:1 |
| Ethylene imine | 860 | Octylchloride | 150 | 20:1 |
| Do | 860 | Butylchloride | 92 | 20:1 |
| Do | 860 | Octadecylchloride plus Butylchloride | 206 23 | 20:0.75:0.25 |
| Do | 860 | Oleic acid chloride | 300 | 20:1 |
| Do | 860 | Stearic acid chloride | 290 | 20:1 |

*Example 2*

A regenerated cellulose film made from viscose is treated in a wash bath with a solution of 1 g. per liter of a reaction product of ethylene imine, butyl chloride and stearyl bromide in the mol ratio of 30:1:1. The plasticizer bath contains 30% of triglycol and 20% of glycerol. The cellulose film is dried at about 90° C. and then coated with a film of polyethylene. The adherence of the polyethylene film to the cellulose film is improved considerably when the cellulose film is treated with the above-mentioned reaction product, and the bond is maintained in boiling water to a satisfactory degree.

*Example 3*

A regenerated cellulose film is manufactured by the cuprammonium process, plasticized by treatment with a solution of 70 g. per liter of ethylene glycol, and then led through a bath containing 2.5 g. per liter of a reaction product of ethylene imine and stearic acid chloride in the mol ratio of 25:1. The excess solution is removed by pressing, and the film is dried. The film is then coated in a lacquering machine with a 15% solution of mixed polymer of 90 parts of assymmetric dichloro ethylene and 10 parts of acrylic acid methyl ester in equal parts of methyl ethyl ketone and toluene. This latter operation can be done immediately after the treatment with the bonding material or after storing the cellulose film rolls for one or several days. The bonding of the hydrophobic coating on the film passes the hot water test described in Example 1 with very good results.

No tendency of the unlacquered film to stick together can be detected. The reduction of the sticking tendency of this cellulose film can be proved by comparing it as follows with a sample of film which has been treated with an aqueous solution of 2.5 g. per liter of polyethylene imine.

Two pieces of film of each sample and of the size 5 x 5 cm. are placed in a drying cabinet at 50° C. and under the pressure of 200 g. per square cm. for 24 hours. After removal from the drying cabinet, the film prepared with polyethylene imine sticks together, while the film samples prepared with the above mentioned reaction product fall apart immediately.

What I claim is:
1. An article of manufacture comprising a film of regenerated cellulose which is impregnated with a reaction product of a 1,2-alkylene imine and a member selected from the group consisting of an alkylating agent having from 4 to 22 carbon atoms in the alkyl radical and an acylating agent having from 4 to 22 carbon atoms in the acyl radical reacted at a mol ratio in the range of between 4 and 100 mols of said 1,2-alkylene imine to one mol of said member.

2. An article of manufacture comprising a regenerated cellulose film impregnated with from 0.01 to 0.5 percent by weight, based on the film, of a reaction product of a 1,2-alkylene imine and a member selected from the group consisting of an alkylating agent having from 8 to 18 carbon atoms in the alkyl radical and an acylating agent having from 8 to 18 carbon atoms in the acyl radical reacted at a mol ratio in the range of between 8 and 40 mols of said 1,2-alkylene imine to one mol of said member.

3. An article of manufacture comprising a regenerated cellulose film which is impregnated with a reaction product of a 1,2-alkylene imine and a member selected from the group consisting of an alkylating agent having from 4 to 22 carbon atoms in the alkyl radical and an acylating agent having from 4 to 22 carbon atoms in the acyl radical reacted at a mol ratio in the range of between 4 and 100 mols of said 1,2-alkylene imine to one mol of said member, said impregnated cellulose film being coated with a hydrophobic, moistureproof coating of a high molecular weight coating composition.

4. An article of manufacture comprising a regenerated cellulose film which is impregnated with a reaction product of a 1,2-alkylene imine and a member selected from the group consisting of an alkylating agent having from 4 to 22 carbon atoms in the alkyl radical and an acylating agent having from 4 to 22 carbon atoms in the acyl radical reacted at a mol ratio in the range between 4 and 100 mols of said 1,2-alkylene imine to one mol of said member, said impregnated cellulose being coated with a moistureproof high molecular weight coating of nitrocellulose.

5. An article of manufacture comprising a regenerated cellulose film which is impregnated with a reaction product of a 1,2-alkylene imine and a member selected from the group consisting of an alkylating agent having from 4 to 22 carbon atoms in the alkyl radical and an acylating agent having from 4 to 22 carbon atoms in the acyl radical reacted at a mol ratio in the range between 4 and 100 mols of said 1,2-alkylene imine to one mol of said member, said impregnated cellulose being coated with a moistureproof high molecular weight coating of a vinyl polymer.

6. An article of manufacture comprising a regenerated cellulose film which is impregnated with a reaction product of a 1,2-alkylene imine and a member selected from the group consisting of an alkylating agent having from 4 to 22 carbon atoms in the alkyl radical and an acylating agent having from 4 to 22 carbon atoms in the acyl radical reacted at a mol ratio in the range between 4 and 100 mols of said 1,2-alkylene imine to one mol of said member, said impregnated cellulose being coated with a moistureproof high molecular weight coating of polyethylene.

References Cited in the file of this patent

UNITED STATES PATENTS

| | | |
|---|---|---|
| 2,280,829 | Jebens | Apr. 28, 1942 |
| 2,286,726 | Gordon | June 16, 1942 |
| 2,314,968 | Bestian et al. | Mar. 30, 1943 |
| 2,327,760 | Bestian | Aug. 24, 1943 |
| 2,719,798 | Wooding et al. | Oct. 4, 1955 |
| 2,763,571 | Wooding et al. | Sept. 18, 1956 |
| 2,784,116 | Lakatos et al. | Mar. 5, 1957 |
| 2,823,141 | Hagan et al. | Feb. 11, 1958 |
| 2,933,416 | Haakh et al. | Apr. 19, 1960 |

UNITED STATES PATENT OFFICE
CERTIFICATION OF CORRECTION

Patent No. 3,009,831                          November 21, 1961

Hubert Wilfinger

It is hereby certified that error appears in the above numbered patent requiring correction and that the said Letters Patent should read as corrected below.

Column 4, line 52, after "bonding" insert -- of the --.

Signed and sealed this 24th day of April 1962.

(SEAL)
Attest:

ESTON G. JOHNSON                          DAVID L. LADD
Attesting Officer                            Commissioner of Patent